April 20, 1937. A. A. HODGKINS 2,077,413
AUTOMATIC CLUTCH CONTROL
Filed Dec. 12, 1931 4 Sheets-Sheet 1
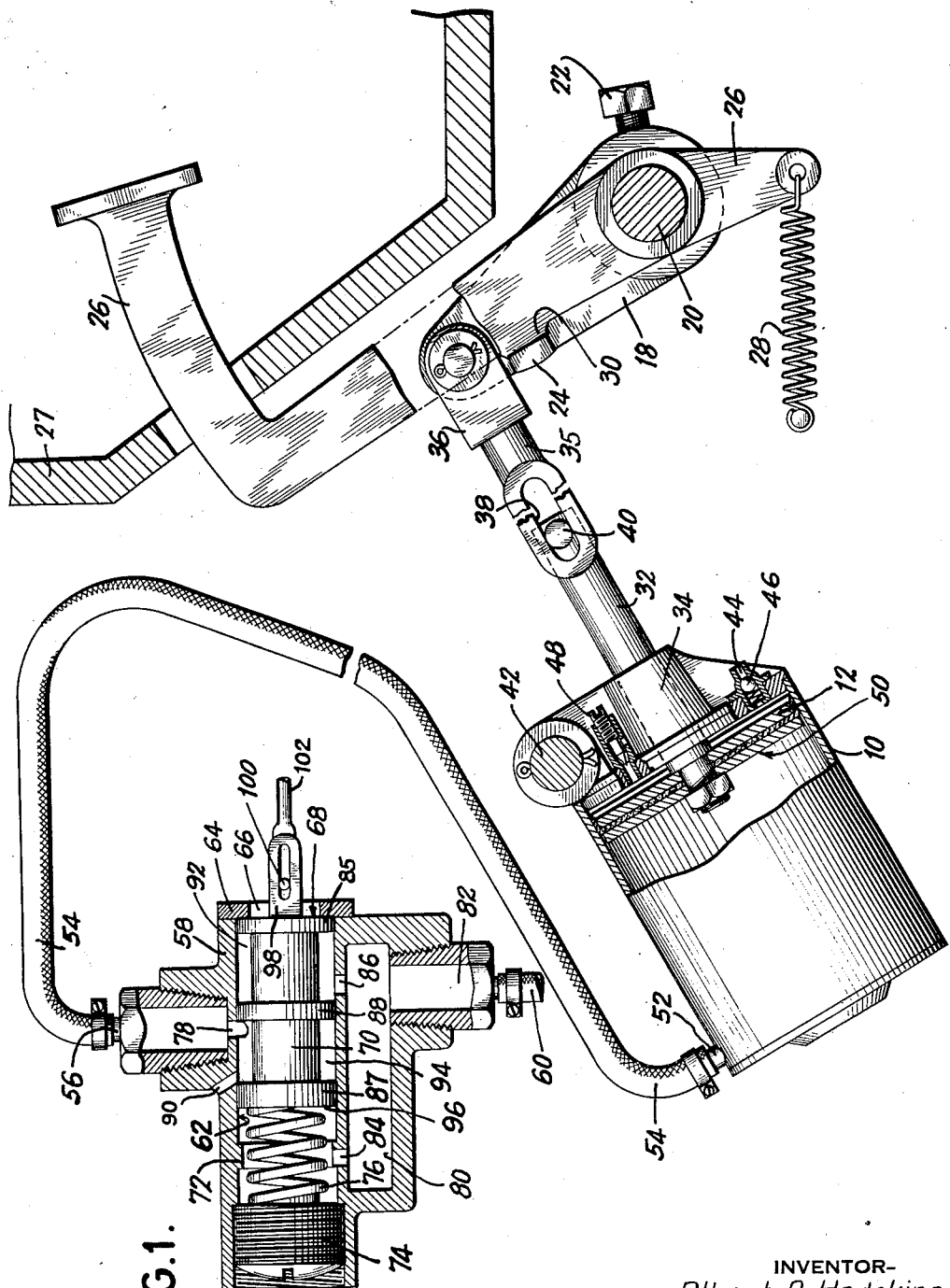
INVENTOR-
Albert A. Hodgkins
BY
Bohleker & Ledbetter
ATTORNEYS April 20, 1937.  A. A. HODGKINS  2,077,413
AUTOMATIC CLUTCH CONTROL
Filed Dec. 12, 1931   4 Sheets-Sheet 2
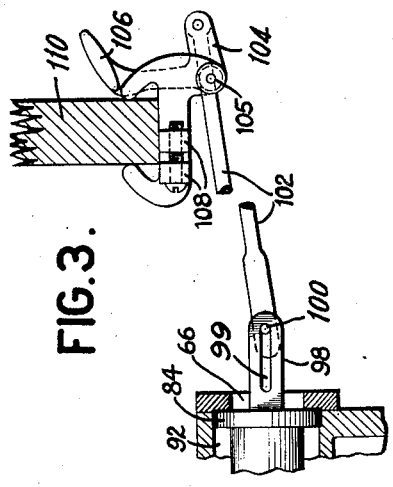
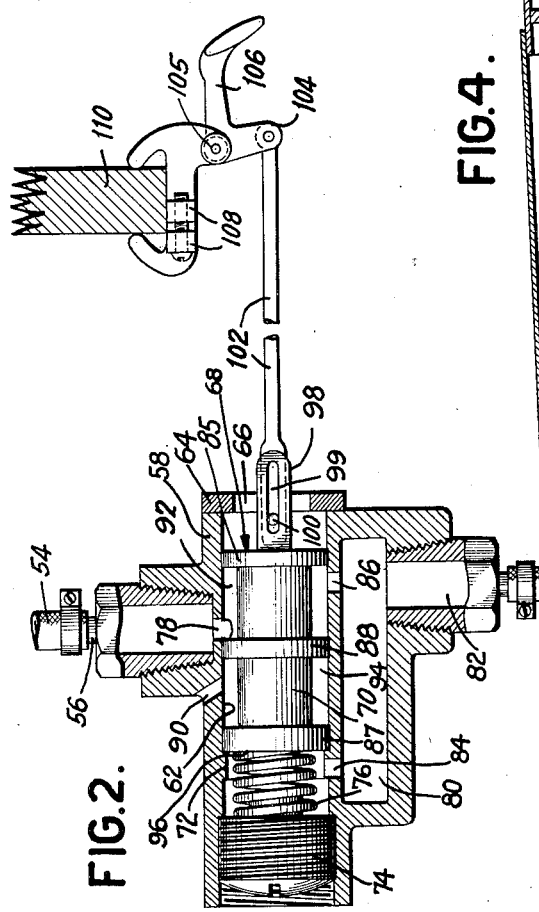
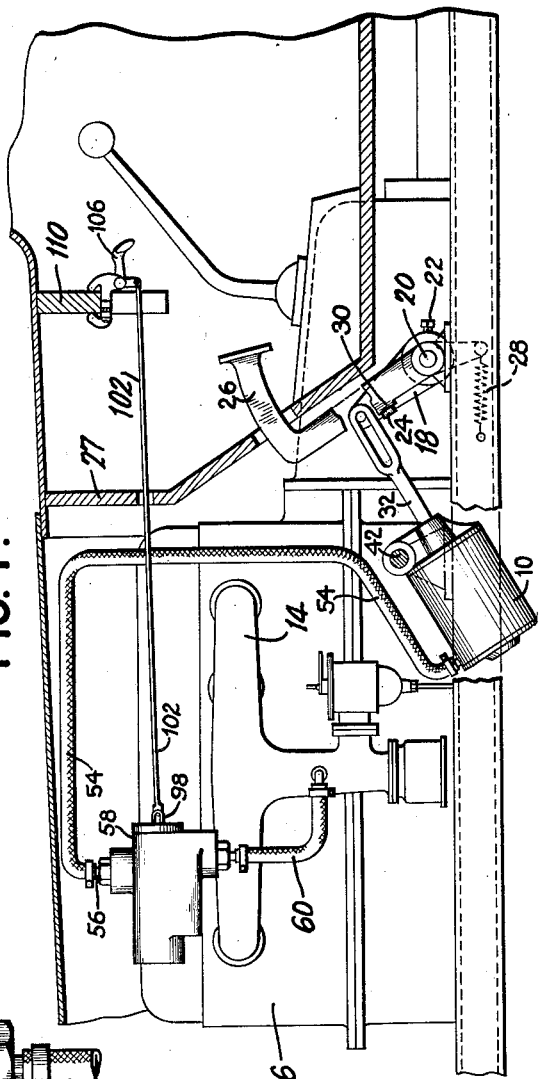
INVENTOR
Albert A. Hodgkins.
BY
Bohleber & Ledbetter
ATTORNEYS

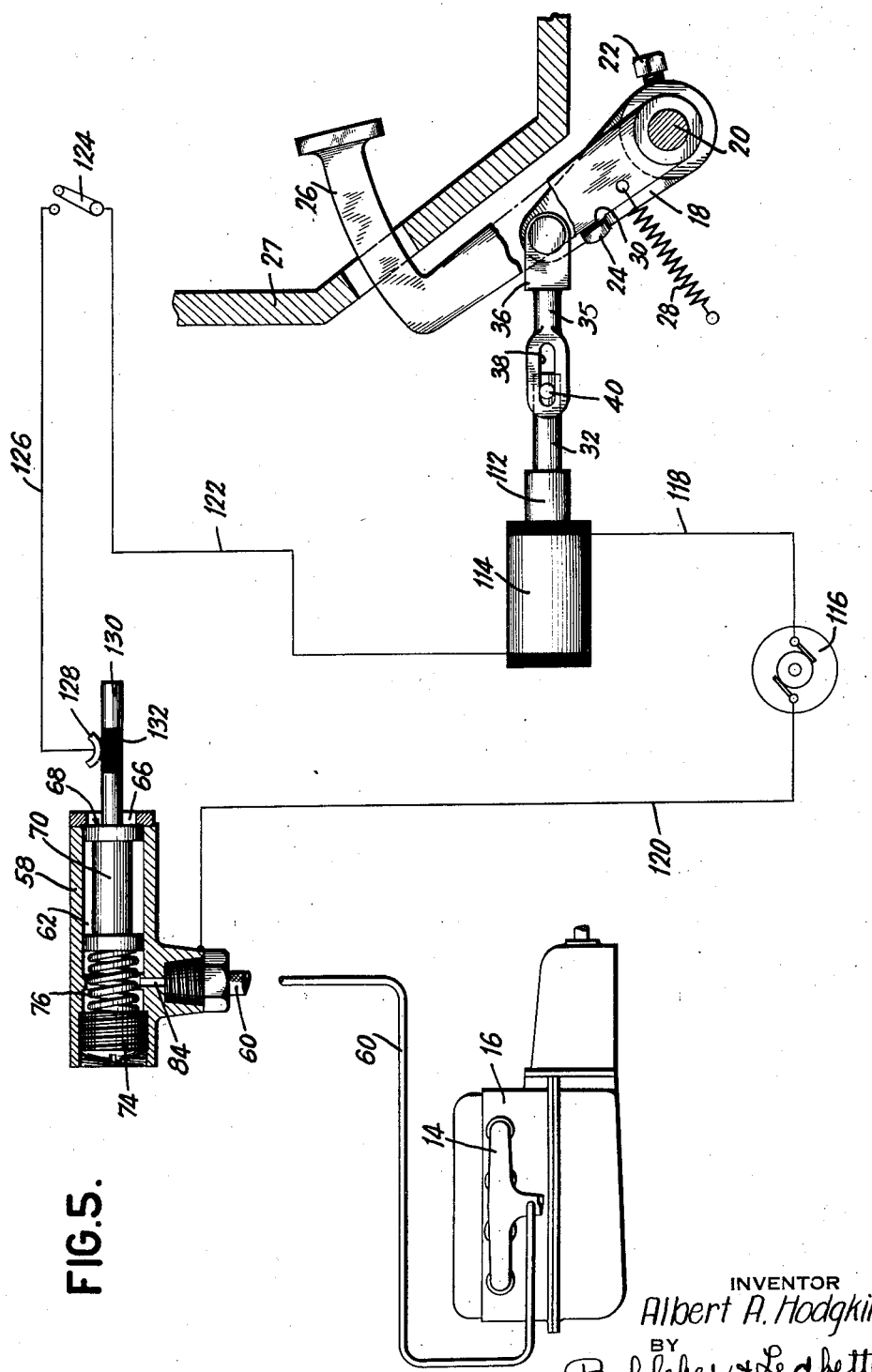

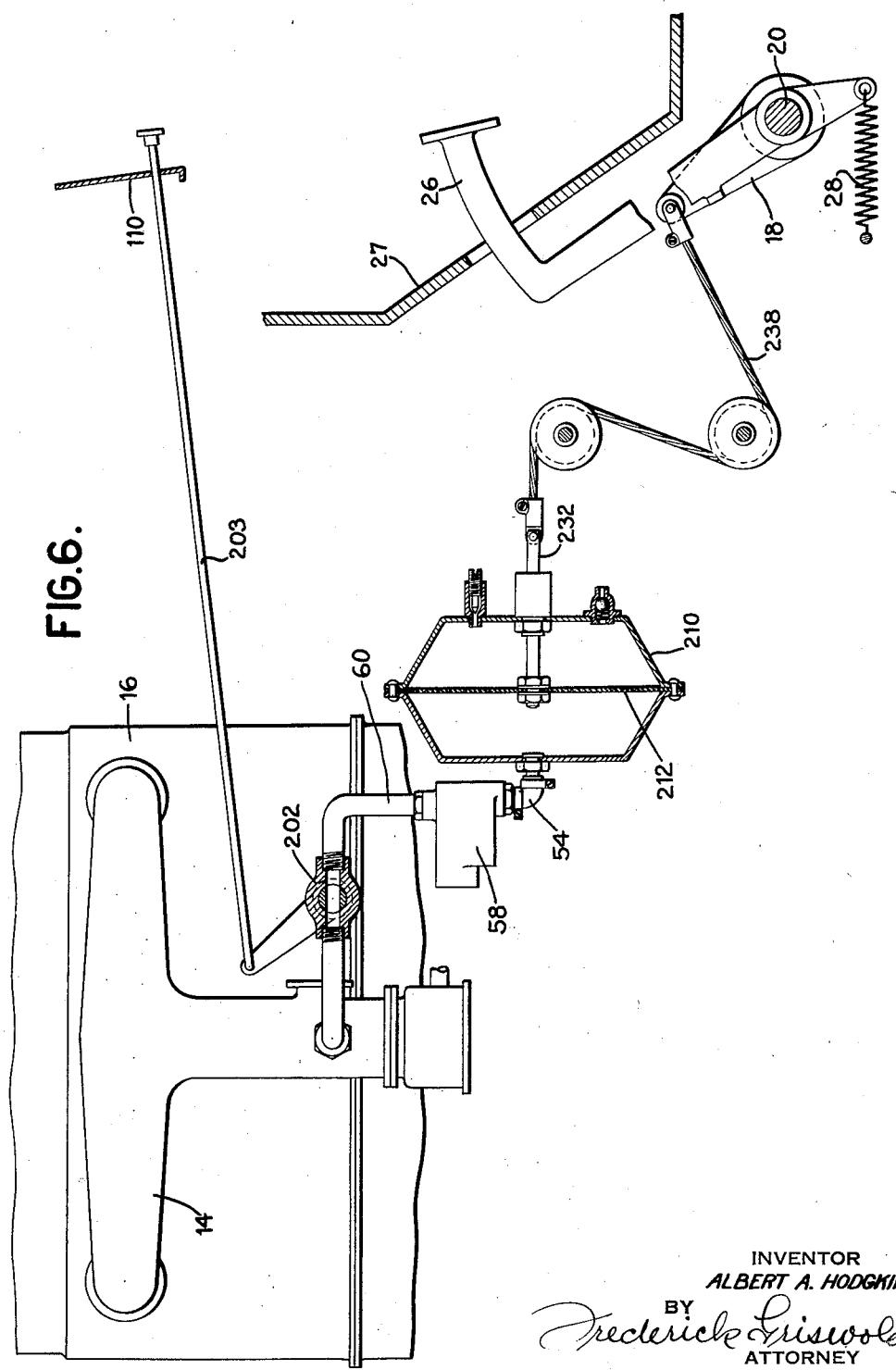

Patented Apr. 20, 1937

2,077,413

UNITED STATES PATENT OFFICE 2,077,413

AUTOMATIC CLUTCH CONTROL

Albert A. Hodgkins, Leonia, N. J., assignor, by mesne assignments, to Bendix Products Corporation, South Bend, Ind., a corporation of Indiana Application December 12, 1931, Serial No. 580,526

5 Claims. (Cl 192—.01)

This invention relates broadly to the automatic performance of shifting movements by means of power actuators or servo motors. More particularly, the invention relates to the automatic control of such power actuators or servo motors.

It has heretofore been proposed to provide a pneumatically operated motor actuated by the sub-atmospheric pressure in the intake manifold of an internal combustion engine, the piston or diaphragm thereof being linked to the clutch pedal, say, of a self-propelled vehicle, to cause the setting and release of the clutch by the variations of the fluid pressure in the manifold. To control the operation of the motor, a valve has been provided in the communicating passage between the engine and the motor, which valve has been actuated mechanically from the throttle of the engine.

One object of the present invention is to provide instrumentalities whereby a motor, either one operated by fluid pressure differential or one which is electrically energized, can be rendered inoperative when it is not desired that the motor effect a shifting movement.

The invention also seeks a pneumatically operated power device which shall be self-actuating and not dependent upon the action of the operator of the engine. To this end, the control devices are susceptible to fluctuation in the fluid pressure in the intake manifold or cylinder of an internal combustion engine.

It is also an object of the invention to attain free wheeling of a self-propelled vehicle automatically whenever the momentum of the vehicle exceeds the speed of the prime mover.

Yet another object of the invention is the provision of a shifting member which can be operated or moved by a servo motor and which can also be operated or moved by a manually actuated lever or pedal but in which the manually actuated lever or pedal is not displaced when the servo motor operates.

The invention also has to do with a motor controlling device actuated by fluctuations in the fluid pressure in the intake manifold or other chamber which shall be practical from the standpoint of ease and cheapness of manufacture and reliability and convenience in use.

These and other objects of the invention and the means for their attainment will be more apparent from the following detailed description taken in connection with the accompanying drawings illustrating various embodiments by which the invention may be realized, and in which:—

Figure 1 is a view showing, partly in elevation and partly in section, the invention applied to a pneumatically operated motor operatively connected with the clutch actuating shaft of a motor vehicle, the governing valve closing communication with the motor.

Figure 2 is a view, showing, in section, the governing valve in open position, together with cut-out devices, in inoperative position, adapted to render the valve inoperative.

Figure 3 is a view showing the cut-out devices in operative position.

Figure 4 is a view showing the prime mover and transmission of a motor vehicle, to which the invention is applied.

Figure 5 is a view, somewhat diagrammatic, showing a modified governor valve controlling an electrically energized motor actuating a shifting element of a motor vehicle.

Figure 6 is a view somewhat similar to Figure 4 showing modified forms which some of the component elements of the device may take.

The invention is illustrated as applied to a clutch control for motor vehicles, although that is only one of its many applications.

In previous proposals for the control of clutches in motor vehicles, the clutch pedal has been connected to one side of the piston or diaphragm of a vacuum cylinder or servo motor, while the cylinder on the other side of the piston has been in communication with the intake manifold of the engine through a pipe which is controlled by a valve. The valve is normally closed by a spring to shut off the power cylinder from the vacuum in the manifold. Valve operating means is connected with the foot throttle or accelerator pedal, so that when the accelerator pedal is released and the accelerator pedal spring returns it to normal position, it opens the valve in the vacuum line and permits the vacuum in the manifold to draw the piston in the cylinder and thus depress the clutch pedal and release the clutch. When the accelerator is depressed, the valve closes and the clutch pedal is released to permit the clutch to engage. Among the disadvantages of this type of clutch control is that it is effective solely when actuated by the operator of the vehicle and is not responsive to the load on the engine and does not automatically release the clutch when the momentum of the vehicle is in excess of the speed of the engine.

The present invention when applied as a clutch release for automotive vehicles provides a true free-wheeling in that the engine is automatically declutched from the propeller shaft whenever the momentum of the vehicle exceeds the propulsive effort of the engine.

It has been found that the conditions of subatmospheric pressure or vacuum in an internal combustion engine fluctuate with the load on the engine. That is, when there is no load on the engine, the downward movement of the pistons on the intake stroke increases the rarification in the intake manifold and combustion chamber. Similarly, this rarification in the intake manifold and combustion chamber increases as the throttle valve controlling the carburetor is closed. Thus, for example, when the vehicle is stationary and the engine idling, the rarification of atmosphere, or, as it is said, the vacuum in the manifold is high. If the throttle is opened, due to the inrush into the intake manifold and combustion chamber of the explosive mixture, the rarification or vacuum drops momentarily and then gradually builds up again as the pistons reciprocate. Thus, when the vehicle commences to move, first because of the opening of the throttle and then because of the load on the engine, there results a decrease in the rarification of the atmosphere or vacuum in the manifold, but as the vehicle gathers momentum, the load on the engine decreases and the vacuum increases in the manifold and explosion chambers. Advantage is taken of this fluctuation of the fluid pressure in the manifold and explosion chambers by providing a valve which is susceptible thereto and which controls the furnishing of power to motor means, for instance, controls communication between a fluid pressure actuated motor and a source of fluid pressure. In other words, when applied to the intake manifold and/or combustion chambers of an internal combustion engine or any other chamber in which the fluid pressure fluctuates, the valve is responsive to fluctuations or variations in the degree of vacuum and is self-opening and closing dependent upon the degree of rarefaction in the chambers.

The invention is illustrated as applied to motor means adapted to actuate or shift the clutch releasing lever in an automotive vehicle, but it will be readily apparent that the invention is equally applicable to any sort of controlling instrumentality for any purpose and is operable by any source of fluid pressure in which the fluid pressure fluctuates. In the illustrated embodiment, the fluctuating fluid pressure existing in the intake manifold and explosion chambers of an internal combustion engine is the source, but broadly, any source of rarefied atmosphere will be contemplated and in such broad aspect will be referred to as a chamber in which the fluid pressure fluctuates, or as suction inducing means. Also, any kind of motor to effect a shifting movement may be used. In Figure 5, the motor means 10 is illustrated as an electro-magnet or solenoid.

The mechanism by which the shifting movements are effected is illustrated in Figures 1 through 4 as a power actuator or servo motor 10, in which differential pressures are obtained by means of partial vacuum on one side of a piston 12, and atmospheric air or other high pressure fluid on the other side, suction for producing the desired differential pressure being shown as obtained from the intake manifold 14 (Figure 4) of an internal combustion engine 16 and the motor 10 is shown as applied to the clutch shifting element 18, 20 of an automobile. The clutch shifting arm 18 is fixed on a shaft 20, as by the set screw 22, and has a lug or protuberance 24 thereon. This arm 18 and the shaft 20 to which it is affixed normally assumes the position shown in Figure 1, by virtue of the clutch spring (not shown) which normally urges the clutch elements into engagement. Loosely mounted on the shaft 20 is the foot pedal 26, which is normally retained in the elevated position by means of the spring 28. The foot pedal 26 has a bearing surface 30 for engagement with the protuberance 24 on the arm 18. Thus, when the foot pedal 26 is depressed, the arm 18 is rotated in a counter-clockwise direction to release the clutch, but when the motor means 10, next to be described, is operated, the clutch operating shaft 20 is turned, but the foot pedal 26 does not move.

To release the clutch automatically, the clutch arm is conected to motor means preferably operated by fluid pressure differential, such as the movable wall or sliding piston 12 of a vacuum cylinder 10. While a sliding piston 12 is shown in Figure 1, it will be obvious that a diaphragm 212 (Figure 6) in a motor 210 might be employed instead. As shown (Figure 1), the piston 12 has secured thereto a connecting rod 32 journalled in a bearing 34 on the cylinder 10, which connecting rod 32 is connected to the end of the lever 18 by connecting means affording a lost motion connection therebetween. Such connecting means may be flexible and comprise a cable 238 (Figure 6) extending between the movable piston rod 232 or diaphragm 210 and the lever 18, but in Figure 1 of the drawings is illustrated as a link 35 carried with a clevis 36 on the end of the lever 18 and formed at its remote end with an elongated slot 38 within which a pin 40 on a piston rod 32 freely moves. Thus the lost motion connection 38, 40 permits the lever 18 to be depressed by the foot pedal 26 without compelling the piston 12 to move within the cylinder 10, as will be understood.

In order that the motor 10 may conform to the movement of the clutch operating lever 18, it is pivotally supported, as at 42. By the port 44, controlled by the ball valve 46, the face of the piston 12 is subjected to atmospheric pressure and an adjustable needle valve 48 permits the slow escape of air at atmospheric pressure whereby the piston may return under the influence of the clutch spring, which normally urges the clutch elements to engage. This gradual return of the piston to initial position prevents too sudden engagement of the clutch elements, which would jolt and jar the machinery. The interior of the cylinder 10 on the side of the piston 12 remote from the bleed port 44, that is, on the face 50 of said piston, is subjected to the vacuum of the intake manifold through a port 52 connected by a flexible tube 54 to a pipe 56 which, in turn, is connected by a valve structure 58, next to be described, to a tube 60 leading into the intake pipe or manifold 14 of the engine 16.

Communication between tube sections 54 and 60, and hence between the motor 10, if pneumatically operated, and the suction inducing means 14, is controlled by a valve. This valve comprises a casing 58, having a bore or cylinder 62, preferably of constant diameter. The bore 62 is conveniently cylindrical, from manufacturing and operating considerations, as will be understood. Casing 58 may be a die casting or the like formed with a cylindrical bore 62 closed at one end by a stop plate 64 formed conveniently, centrally, with a vent 66, whereby the face 68 of the valve 70, exposed thereby, is subjected to the pressure of the atmosphere. Proximate the opposite end of the cylinder 62, the inner periphery thereof is provided with a piston stop 72 formed, conveniently, by an inwardly directed flange or bead 72 and the end of the bore 62 on the side opposite to the vent 66 is shown as closed by a removable plug 74 serving as an adjusting screw to place the spring 76 under desired tension.

Opening into one side of the bore 62 is a port 78 to which the pipe 54 leading to the power cylinder 10 is connected. This port 78 is preferably elongated circumferentially of the bore in order that the passage through which the sub-atmospheric pressure is applied to the motor piston 12 may have an adequate cross-sectional area substantially equivalent to the cross-sectional area of the passage 54.

The side of the bore 62 opposite to port 78 is shown as formed with a by-pass passage 80 opening into a port 82 communicating with the tube 60 leading to the intake manifold 14 of the engine. By-pass 80 has two ports, one indicated at 84 leading to that bore portion within which the end of the piston is exposed to the suction of the manifold, and the other port indicated at 86, opening into the bore upon the opposite side of the port 78.

The piston valve member comprises, in the illustrated embodiment, a cylindrical body portion 70 having a circular atmospheric pressure receiving flange 85 at the end nearest the vent 66 and a circular piston flange 87, which is subjected to the sub-atmospheric pressure of the intake manifold at the opposite end, and a cylindrical valve member flange 88 intermediate the two former flanges, which serves to control the communication between the motor port 78 and the source of sub-atmospheric pressure and the bleed port 90, respectively, as conditions require.

These three flanges 85, 87, and 88 are all of the same diameter and closely fit within the bore for reciprocation therein. They are greater in diameter than the cylindrical body 70 so that the spaces between the body 70 and periphery of cylinder 62, defined by the respective flanges, form passages, one passage 92 establishing communication between the ports 86 and 78, and the other passage 94 establishing communication between port 78 and bleed port 90.

The piston valve 70 is normally urged to the position shown in Figure 1 by a spring 76 engaging the face 96 of the piston flange 87, and seated on the spring tension adjusting screw plug 74. The spring 76 is of such strength as to effectively position the valve to close off the port 78 from port 86 at sub-atmospheric pressures greater than a predetermined minimum, and its adjustment to suit particular conditions is effected by the plug 74.

In order that the operation of the device may be clearly understood, it must be appreciated that when the engine is not operating, that is, when it is at rest, the fluid pressure of the gaseous contents of the intake manifold is substantially at-atmospheric pressure because the intake manifold is in communication with the inlet of the carburetor. When the crank shaft is turned over, as by a self-starter, the fluid pressure in the manifold is sub-atmospheric and results from the down stroke of the piston. The sub-atmospheric pressure is increased somewhat, i. e., the suction is lessened, however, in the manifold by the in-rush of air through the inlet of the carburetor, or, as is said, the vacuum is decreased. Thus, if a motor vehicle is standing and the engine is idling with the transmission gears out of mesh, the fluid pressure in the manifold may be found on a gauge to be, say, ten pounds (twenty inches of mercury). When the clutch is released, the propeller shaft connected through low gear with the engine, the clutch reengaged, and the throttle valve opened, there is a momentary increase in the fluid pressure, i. e., decrease in the vacuum, in the manifold, say, to three pounds. As the car gathers momentum, the vacuum in the manifold increases until it registers ten pounds on the gauge again. This same cycle of conditions occurs at every shift to another gear ratio. Again, when the vehicle is travelling along the level or on a down grade, it frequently happens that the momentum of the car, and hence the revolutions per minute of the propeller shaft, exceeds the speed of rotation of the crank shaft of the engine and hence, the engine being relieved of load, the vacuum in the manifold again increases. It will thus be seen that there is a condition of high vacuum in the intake manifold of the engine at times when there is no load on the engine, and at such times there is no occasion for the engine to be clutched to the propeller shaft of the vehicle. At other times, as in starting and when there is a load on the engine, the propeller shaft must be clutched to the engine and this is at a period of low vacuum in the manifold.

In accordance with this invention, the controlling valve for the servo motor is so constructed as to be actuated by the aforesaid predetermined high vacuum of the engine to open the communication between the pipes 60 and 54, that is, between the power cylinder 10 and the intake manifold 14 of the engine.

Normally, in periods of low vacuum in the manifold, the piston valve assumes the position illustrated in Figure 1. It will be observed that the manifold port 86 and the power cylinder port 78 are disposed in transverse planes so spaced as to permit the valve flange 88 to lie therebetween and cut off communication therebetween. The valve piston port 84 is disposed on the other side of the stop 72 from the valve. In this position, with the valve closing off the motor 10 to the sub-atmospheric pressure of the intake manifold, the flange 88 is closely adjacent the vent 66.

When the valve piston is disposed in the inactive position of Figure 1, with the valve 88 lying between the cylinder port 78 and the manifold port 86 and thus cutting off the power cylinder from the manifold 14, the cylinder port 78 and a bleed port 90 are both uncovered and in communication with the bleed passage 94 so that atmospheric pressure is admitted to the power cylinder permitting the power cylinder to be returned by the clutch spring to the inactive position of Figure 1. This condition obtains so long as the vacuum in the manifold is below a predetermined maximum.

When the vacuum in the manifold rises to or above a predetermined value, the reduction in fluid pressure on the piston face 96 permits atmospheric pressure, acting through vent 66 on the face 68 of flange 85, to overcome the force of the spring 76 and the valve piston is moved to the left, as shown in Figure 2, until stopped by the piston stop 72.

In such position, the valve 88 lies between the bleed port 90 and the power cylinder port 78 cutting off the power cylinder 10 from atmosphere. Ports 78 and 86 both, however, open into valve passage 92 and are thus in communication, and the higher vacuum of the manifold is applied to the cylinder 10 and permits atmospheric pressure through port 44 to force the piston 12 down, to actuate the shifting member 18. When the vacuum drops in the manifold, the spring 76 again forces the piston valve 70 to the right, to the position shown in Figure 1, and puts the power cylinder in communication with the bleed port 90 and thus admits atmospheric pressure to cylinder 10 to facilitate the return of the piston 12 under the influence of the clutch spring (not shown) and the reengagement of the clutch.

In some situations, it may be found desirable to render inoperative the automatic control of the fluid pressure operated motor 10. To this end, provision is made for locking the valve 70 in inoperative position by cut-out devices, shown in Figures 2 and 3.

The pressure flange 85 is conveniently provided with a slotted extension 98 protruding through the vent 66. Movable in the slot 99 is a pin 100 on the end of a link 102 which, conveniently, passes freely through the dash board 27 of the vehicle and is connected at its extremity with the downwardly depending arm 104 of a bell crank like operating lever 104, 106 pivotally secured, as by clamp means 108, to the instrument panel 110. When the lever arm 104 is depending, as shown in Figure 2, the link 102 is forward and the piston valve 70 is free to move under the influence of vacuum. If, on the other hand, the handle 106 is moved up to the position shown in Figure 3, the pin 100 is in the rear end of the slot 99, and is so held by reason of the toggle effect produced by horizontal arm 104 of the bell crank and link 102 lying above the pivot 105, and the piston valve 70 is thus held against movement.

It will be apparent that this locking device or holding device which renders the valve inoperative may equally well be a supplemental valve in either the conduit 54 or 60 as well as a mechanical device by which the valve 58 is controlled manually. A two way valve 202, actuated manually by a rod 203 from the dash 110, is shown in the conduit 60 which may be turned to close the line to the automatic bleed 58 and thereby bleed the pneumatic motor to atmosphere.

The operation of the device when applied to a clutch operating lever 18 will be readily understood by those skilled in the art from the foregoing description. Suffice it to say that the engine 16 is started in the ordinary manner with the change speed gears (transmission gearing) in neutral and with the clutch pedal 26 depressed by the operator. The hand throttle may always be set and remain in the idling range of the engine. When the engine is warmed to run smoothly, the clutch shifter arm 18 automatically becomes, and is held, in clutch disengaged position by the servo motor 10. The clutch pedal 26, however, does not remain and never becomes depressed, but remains in its elevated position at all times except when depressed by the foot. The operator may now shift to low gear and upon depressing the accelerator pedal or otherwise opening the throttle and thus decreasing the vacuum in the manifold 14, the clutch becomes reengaged and the vehicle moves off. When the vehicle has attained the required momentum, the operator may lift the foot off the accelerator, thus taking the load off the engine, the clutch immediately becoming disengaged and the operator may shift into intermediate gear. As soon as the throttle is again opened, the suction decreases momentarily, the clutch is reengaged and the vehicle proceeds in intermediate gear. Again, to shift to high gear, the operator raises the foot off the accelerator pedal after the vehicle has attained the desired momentum, and the clutch then becomes disengaged, the shift into high gear is made and the opening of the throttle again causes the clutch to engage. The vehicle is then propelled by the engine in the usual manner. If free wheeling is desired, it is only necessary to lift the foot off the accelerator, the engine speed immediately decreases to that below which the propeller shaft is turning, thus relieving the engine of load and the clutch becomes disengaged and does not become reengaged until the momentum of the vehicle decreases to a point at which the vehicle becomes a load on the engine again. The clutch release thus described is operable equally as well with the hand throttle as with the foot accelerator and is, in every sense, true free wheeling as distinguished from those proposals in which the valve, governing the clutch actuating motor, is mechanically actuated by a positive connection with the foot accelerator.

As will be apparent from the foregoing description, the invention is equally applicable to a motor, which, say, is electrically energized for effecting a shifting movement. Such a motor and the controlling means therefor is illustrated in Figure 5. The movable armature 112 of the electro-magnet 114 is there shown as connected, as by a link 35 or other device capable of lost motion, with the clutch actuating mechanism 18, 20 of a motor vehicle. The source of electrical energy is indicated as the generator 116 in circuit with the motor 114 by the wire 118. The other brush of generator 116 is, conveniently, electrically connected with the valve casing 58 by the wire 120. The other terminal of the electro-magnet 114 is connected, say, by wire 122 to a circuit closing device 124 on the instrument panel of the vehicle and the other pole of the switch is electrically connected, as by wire 126, to a contact, shown as the wiper 128 proximate the controlling valve 58.

The valve operates on the same principle as the controlling valve previously discussed, but since it does not serve to control a conduit to the intake manifold no port therefor is provided. The tubular casing has only one port 84, communicating with the conduit 60 leading to a chamber 14 in which fluid pressure fluctuates. Within the cylinder 62 reciprocates a plunger or valve 70, one face 68 of which is subjected to atmospheric pressure through the vent 66. Force is applied to the other side of the valve piston by an adjustable spring 76. Parts having identical functions are numbered to correspond to Figures 1 and 2. Attached to the valve is a rod or finger 130 adapted for engagement by the wiping contact 128 at all times. The casing 58, valve 70 and rod 130 are of conductive material and, hence, form part of the electrical circuit including the generator. When the switch 124 is closed the circuit, including the motor 114 and generator 116; is thus completed and the motor energized to retract the movable part 112. However, it is only desirable that the circuit be completed when the valve 70 is retracted against spring 76 under conditions of predetermined high vacuum in the suction inducing means 14 and hence the rod 130 is covered with non-conductive material 132 at that place or all places where the rod 130 contacts with wiper 128 except when the rod is retracted with the valve under conditions of high vacuum. Hence, except when the vacuum in the intake pipe, in the illustrated embodiment, reaches the predetermined maximum, the circuit is interrupted by the insulating member 132 interposed between the two contact members 130 and 128.

The operation of the controlling valve in releasing the clutch is thus exactly the same as that of the previously described embodiment and the switch 124 on the instrument panel serves to render the motor inoperative as does the mechanical device illustrated in Figures 2 and 3.

It will thus be seen that a construction is provided which, when applied to the clutch of a self-propelled vehicle, affords automatic free wheeling whenever the prime mover is relieved of load without manual actuation of any instrumentality whatsoever. It will be further noted that the controller valve of this invention is applicable with any sort of power actuator or motor or the like for automatically actuating mechanical elements, as for instance, automatically setting or releasing clutch elements, moving steering mechanisms, setting or releasing brake mechanisms, selectively operating change speed mechanism or performing other shifting movements under the influence of variations of fluid pressure, particularly for automotive vehicles operating on land, on or in the water, or in the air or in fact in any situation where an internal combustion engine or other prime mover has a chamber in which the fluid pressure fluctuates.

Various modifications will occur to those skilled in the art in the disposition and configuration of the component elements going to make up the invention as a whole as well as in the selection and combination of such elements, and in the application of the invention and substitution in its component parts and no limitation is intended by the phraseology of the foregoing description or illustration in the annexed drawings except as indicated in the appended claims.

What is claimed is:—

1. In a controlling device for a pneumatically operated motor comprising a casing, a port therein communicating with the motor, spaced ports therein communicating with a chamber in which sub-atmospheric pressure fluctuates, and a bleed port therein, a member movable therein between at least two positions, said member having two oppositely disposed faces, means to constantly expose one of said faces to sub-atmospheric pressure through one of said spaced ports, a vent to expose the other face to atmospheric pressure, and means to apply a predetermined force to said member acting in the direction opposite to the force of atmospheric pressure, said member being formed with a passage establishing communication between the first named port and the other spaced port in one position and a passage establishing communication between the first named port and the bleed port in a second position.

2. In a controlling device for a pneumatically operated motor, the combination with an internal combustion engine having an intake pipe, a pneumatically operated motor operatively connected with a shifting member and connected in communicating relation with the intake pipe whereby the motor is subjected to the fluid pressure of the intake pipe, of a casing, a valve movable therein between two extreme positions, said valve having three circular flanges, the faces of two of which are directed in opposite directions, said casing being formed with an aperture exposing the one face to atmospheric pressure, a conduit connecting the motor with a port on the interior of the casing, spaced ports on the interior of the casing to expose opposed faces of another flange and the intermediate flanges to the fluid pressure of the intake pipe, a bleed port in the chamber, said first named flange and intermediate flange defining a passage which in one position of the valve connects the first named port and one of the second named ports, said intermediate flange and said another flange defining a second passage which in another position of the valve connects the first named port with the bleed port, a passage between said last named ports, a conduit between the passage and the intake pipe and an adjustable spring opposing the atmospheric pressure on the member.

3. In a controlling device for a pneumatically operated motor, the combination with an internal combustion engine having an intake pipe, a pneumatically operated motor operatively connected with a shifting member and connected in communicating relation with the intake pipe whereby the motor is subjected to the fluid pressure of the intake pipe, of a casing, a valve movable therein between two extreme positions, said valve having three circular flanges, the faces of two of which are directed in opposite directions, said casing being formed with an aperture exposing the one face to atmospheric pressure, a conduit connecting the motor with a port on the interior of the casing, spaced ports on the interior of the casing to expose opposed faces of another flange and the intermediate flange to the fluid pressure of the intake pipe, a bleed port in the chamber, said first named flange and intermediate flanges defining a passage which in one position of the valve connects the first named port and one of the second named ports, said intermediate flange and said another flange defining a second passage which in another position of the valve connects the first named port with the bleed port, a passage between said last named ports, a conduit between the passage and the intake pipe and an adjustable spring opposing the atmospheric pressure on the member and manual means to control the movement of the member.

4. In a device of the character described, the combination with a part to be actuated, a pneumatic motor operatively connected with said part for actuation thereof, suction producing means in which the suction varies, said pneumatic motor being in communication with the suction producing means, a cylindrical valve casing having spaced ports in its side in communication, respectively, with the suction producing means and the pneumatic motor, a bleed port spaced in an axial direction from said port in communication with the pneumatic motor, one end of said casing being open to atmosphere and the other end being in communication with the suction producing means, a cylindrical valve member reciprocable in said casing, spaced portions of which being of lesser diameter, and a spring engaging the end of the valve member and urging it to a position in which one valve member portion of reduced diameter opens communication between the bleed port and the motor, said spring when compressed permitting the other valve member portion of reduced diameter to open communication between the motor and the suction producing means.

5. A clutch control mechanism for an automotive vehicle provided with an internal combustion engine and a clutch mechanism, the latter including a clutch pedal and comprising, in combination therewith, a double-ended fluid motor, the piston of said motor being operatively connected with the clutch pedal, a fluid transmitting connection between said motor and the manifold of the engine, a vacuum operated three-way control valve interposed in said connection, said valve being automatically operated at a predetermined manifold vacuum to place the motor in circuit with the manifold to energize the motor and effect a disengagement of the clutch, and means cooperating with the compression side of the double-ended motor to control the efflux of air from the motor after the control valve is closed to vent the suction side of the motor to thereby regulate the mode of clutch reengagement.

ALBERT A. HODGKINS.